Dec. 29, 1970   R. KINNICUTT, JR   3,550,477
DRIVE MECHANISM
Filed Dec. 31, 1968   3 Sheets-Sheet 1
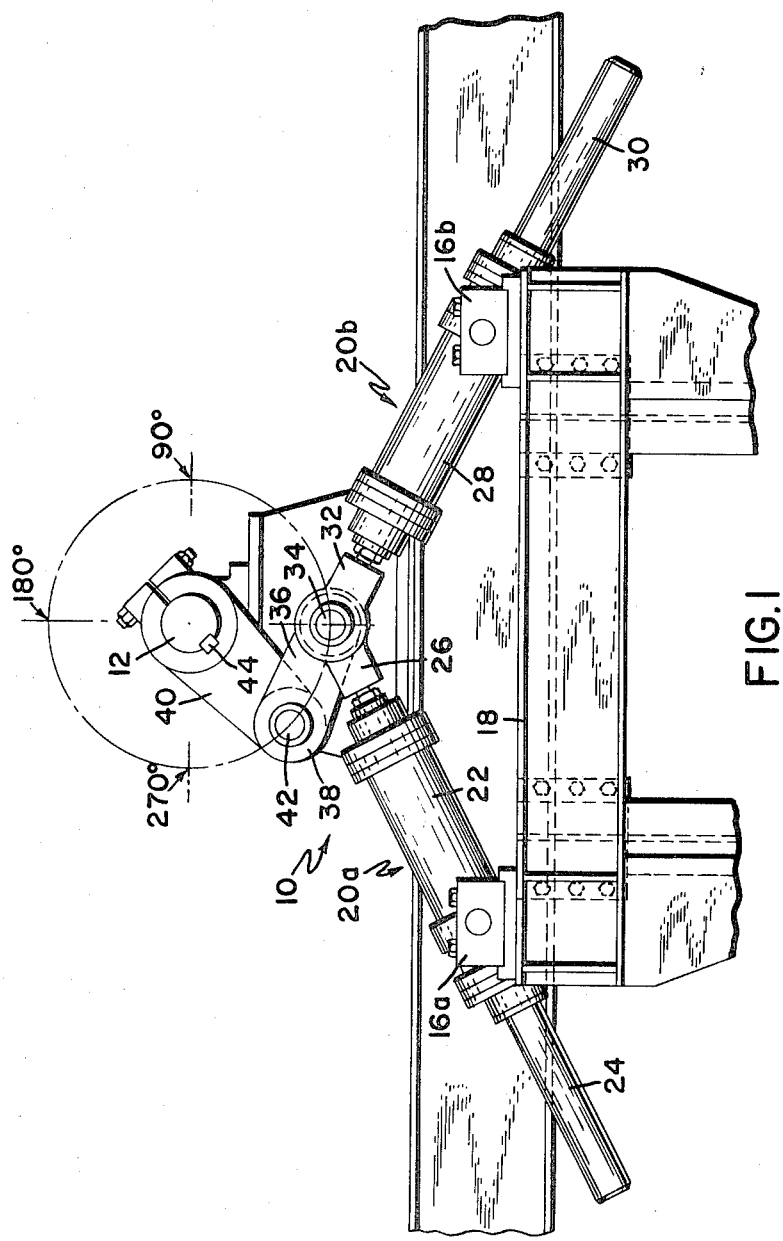
INVENTOR.
ROGER KINNICUTT, JR.
BY Chittick, Pfund,
Birch, Samuels & Gauthier
ATTORNEYS

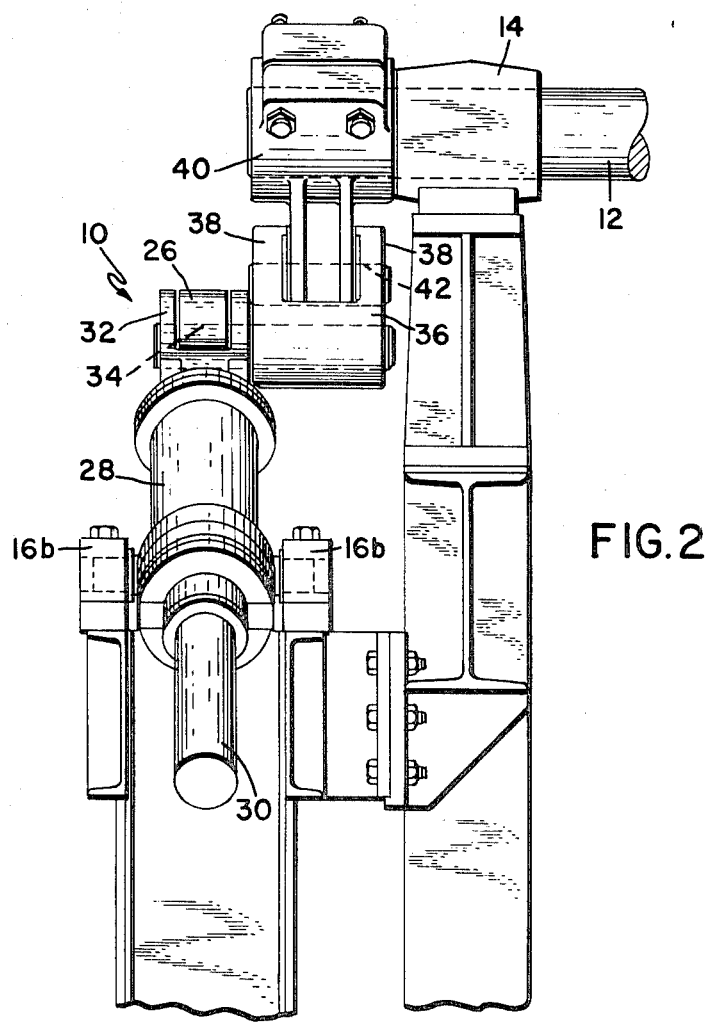

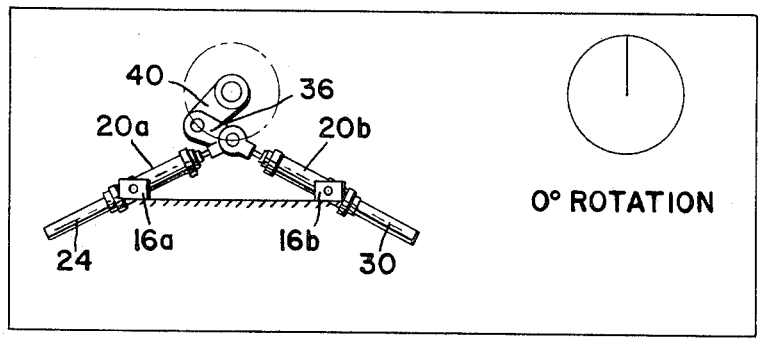
FIG. 3A — 0° ROTATION
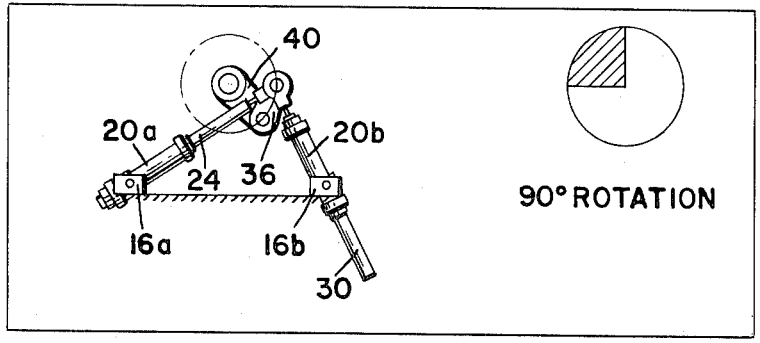
FIG. 3B — 90° ROTATION
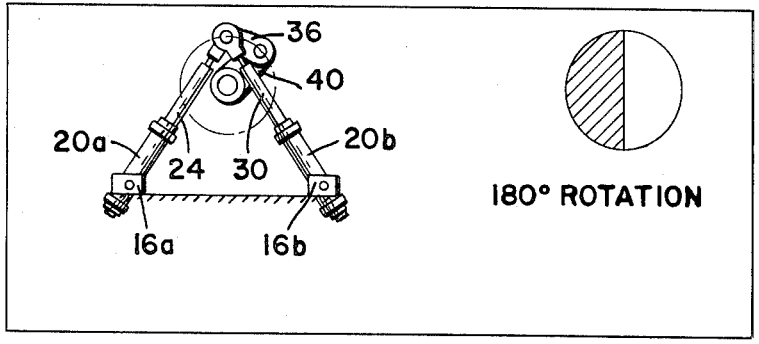
FIG. 3C — 180° ROTATION
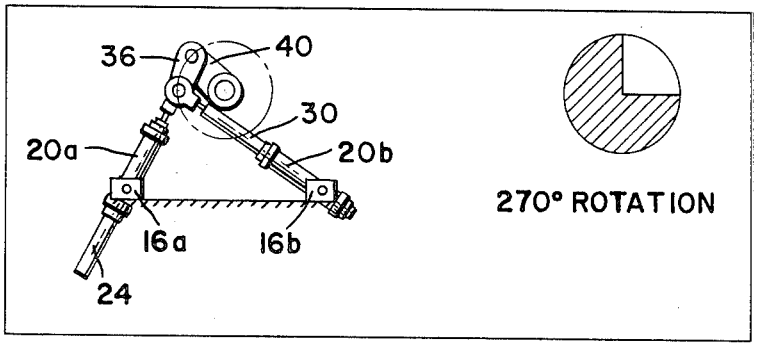
FIG. 3D — 270° ROTATION United States Patent Office 3,550,477
Patented Dec. 29, 1970

3,550,477
DRIVE MECHANISM
Roger Kinnicutt, Jr., Worcester, Mass., assignor to Morgan Construction Company, Worcester, Mass., a corporation of Massachusetts
Filed Dec. 31, 1968, Ser. No. 788,180
Int. Cl. B23b 29/32
U.S. Cl. 74—817　　　　　　　　　　　　　　4 Claims

ABSTRACT OF THE DISCLOSURE

An apparatus for imparting intermittent rotation to a shaft. The apparatus includes a pair of piston and cylinder units pivotally mounted on a fixed base. The pistons are each pivotally connected to an intermediate link which is in turn pivotally connected to a crank arm extending radially from the shaft. By first alternately extending and then alternately retracting the pistons the shaft is caused to rotate intermittently through four successive 90° intervals.

---

This invention relates generally to drive means for shafts, and more particularly to a self-indexing apparatus for intermittently driving a shaft through a series of successive partial turns totalling 360°.

Conventional drive mechanisms of the foregoing type normally include a combination of relatively expensive components such as electric motors, gear reducers, brakes, etc., as well as complicated control systems to insure proper shaft indexing. Where the shaft is heavily loaded, considerable torque is required to start the shaft rotating, and considerable braking force is required to stop rotation. Heavy duty components are therefore needed to carry out these functions, thus further increasing the cost of the apparatus. Moreover, the start and stop operations of the apparatus under full load conditions expose the drive and braking components to heavy stresses which in turn accelerate wear and cause component failures, the net result being frequent down time and high maintenance costs.

An important object of the present invention is to avoid the above-mentioned problems by providing an improved self-indexing means for intermittently driving a shaft through successive partial turns totalling 360°, which means is both simple in design and efficient in operation.

Another object of the present invention is to provide a means for intermittently driving a shaft which does not include the more expensive and complicated components characterizing known prior art devices.

Another object of the present invention is to provide a means for intermittently rotating a shaft through successive partial turns totalling 360°, and for precisely positioning the shaft at the end of each partial turn.

A further object of the present invention is to provide a self-indexing drive means which is capable of extended operation under heavy load conditions without causing excessive wear or damage to the drive components.

A still further object of the present invention is to provide a self-indexing drive means which is simple to control and which requires minimum maintenance.

These and other objects and advantages of the present invention will become more apparent as the description proceeds with the aid of the accompanying drawings in which:

FIG. 1 is a view in side elevation of a self-indexing drive means embodying the concepts of the present invention;

FIG. 2 is a view in end elevation of the apparatus shown in FIG. 1; and,

FIGS. 3A–3D are schematic illustrations which depict one complete cycle of operation.

Referring initially to FIGS. 1 and 2 wherein are best shown general features of a preferred embodiment of the invention, a self-indexing drive mechanism generally indicated by the reference numeral 10 is shown connected to one end of a shaft 12, the latter being journalled for rotation in a bearing 14. Since the apparatus driven by shaft 12 forms no part of the present invention, it has been omitted from the drawings.

Two sets of cylinder trunnions 16a and 16b are supported beneath the end of shaft 12 in a spaced fixed relationship on a stationary support structure 18. The trunnions 16a and 16b provide the means for pivotally mounting two piston and cylinder units 20a and 20b. Unit 20a is comprised of a double acting cylinder 22 containing an extensible piston rod 24 which is provided at one end with a straight clevis 26. The other piston and cylinder unit 20b is similarly comprised of another double acting cylinder 28 containing an extensible piston rod 30 which is provided at its upper end with a forked clevis 32. The piston and cylinder units 20a and 20b are of a standard design and may be operated by any conventional pneumatic or hydraulic means (not shown).

In the operational stage shown in FIGS. 1 and 2, the piston rods 24 and 30 of the units 20a and 20b respectively are fully retracted within the cylinders 22 and 28. Straight clevis 26 is located within the bifrucated portion of forked clevis 32 and both clevises are pivotally connected to a pin 34 extending laterally from one end of an intermediate link 36. The other end of link 36 is provided with a pair of spaced ears 38 straddling the free end of a crank 40. A pin 42 provides the means for pivotally connecting intermediate link 36 to crank 40. The other end of crank 40 is keyed to shaft 12 as at 44.

Having thus described the basic components of an apparatus embodying the concepts of the present invention, the operational sequence of the apparatus will now be reviewed with further reference to FIGS. 3A–3D. FIG. 3A is a schematic illustration of the apparatus at the operational stage shown in FIGS. 1 and 2. The piston rods 24 and 30 are fully retracted and the cylinders 22 and 28 are disposed angularly with respect to each other. For purposes of illustration, this stage in operation has been designated as "0° rotation."

Where the shaft 12 is to be driven in a counterclockwise direction, the first step involves a full extension of piston rod 24 to the position shown in FIG. 3B. The pivotal connection between crank 40 and intermediate link 36 accommodates pivotal displacement of the cylinders 22 and 28 about the axes of trunnions 16a and 16b, the net result being counterlockwise rotation of shaft 12 through 90°. At this point, shaft 12 is precisely positioned at the end of this first 90° turn by virtue of the fact that piston rod 24 has reached the end of its stroke.

FIG. 3C shows the next stage in the operation of the apparatus wherein piston rod 30 is fully extended to rotate shaft 12 in a counterclockwise direction through another 90° increment. Here again, the pivotal connection between intermediate link 36 and crank arm 40 enables the piston and cylinder units 20a and 20b to pivot freely about the parallel axes defined by trunnions 16a and 16b.

As is shown in FIG. 3D, another rotational increment of 90° in a counterclockwise direction is provided by retracting piston rod 24. Finally, by retracting piston rod 30, shaft 12 is rotated in a counterclockwise direction through the last 90° increment to return the apparatus to the condition shown in FIGS. 1 and 2, thus completing one full revolution of 360°.

It will of course be understood by those skilled in the art that intermittent rotation of shaft 12 in an opposite clockwise direction may be accomplished in a similar manner by first extending piston rod 30, then extending piston rod 24, then retracting piston rod 30, and finally retracting piston rod 24.

Having thus described both the design and operation of a preferred embodiment of the present invention, the advantages to be derived therefrom will now be readily apparent to those skilled in the art. For example, the apparatus is comprised of relatively inexpensive components which are capable of extended trouble free operation without extensive maintenance. Operation of the apparatus is relatively uncomplicated and can if desired be manually performed. Where an automated operation is desired, conventional controls may be employed to operate the piston and cylinder assemblies 20a and 20b.

In addition, each piston and cylinder unit 20a and 20b is capable of operating under maximum load conditions at either end of the piston rod stroke. Accordingly, continued start and stop shaft rotation has no adverse effect on these basic drive components. Finally, because of the arrangement of the piston and cylinder units relative to the rotational axis of shaft 12, the apparatus incorporates a self-indexing feature which enables the shaft to be precisely located at the end of each 90° rotational increment.

It is my intention to cover all changes and modifications of the embodiment herein chosen for purposes of disclosure which do not depart from the spirit and scope of the invention as defined by the claims appended hereto.

I claim:

1. Apparatus for rotating a shaft comprising in combination: a fixed base, piston and cylinder units pivotally mounted on said base, and linkage means connecting said units to said shafts, said linkage means including a crank arm connected to said shaft and a link member pivotally connected at one end to said crank arm and at the other end to each said units, the location of the pivot points of said units relative to said shaft being such that alternate extension and retraction of the pistons will result in intermittent partial rotation of said shaft through a total of 360°.

2. The apparatus as set forth in claim 1 wherein said piston and cylinder units are pivotally movable in a plane which is normal to the rotational axis of said shaft.

3. Means for intermittently rotating a shaft comprising: two piston and cylinder units pivotally mounted on a fixed base, the pivotal axes of said units being parallel to the rotational axis of the shaft to be driven, said pivotal axes being so spaced that when the pistons are fully retracted in the cylinders, the pistons may be pivotally connected with their centerlines at an angle to each other, the point of pivotal connection of said pistons defining a first position when the pistons are fully retracted, the extension of said pistons from said cylinders being limited whereby when one piston is fully extended and the other fully retracted, the point of pivotal connection between said pistons will define a second position, when both pistons are fully extended the said pivotal connection point will define a third position and when the one piston is fully retracted and the other piston fully extended the said pivotal connection point will define a fourth position, the first, second, third and fourth positions defining a plane of quadrilateral shape, a crank arm on said shaft, a link pivotally connected at one end to said crank arm and at the other end to the said point of pivotal connection between said pistons, whereby alternate operation of said pistons between fully retracted and fully extended positions will cause said shaft to rotate intermittently through four fractional turns totalling 360°.

4. Means for rotating a shaft through a succession of 90° turns in which said shaft comes to a full stop precisely positioned at the end of each 90° turn, said means comprising a radially extending arm on the end of said shaft, two piston and cylinder units of which each cylinder is pivotally mounted on a bearing supported on a fixed base, a link pivotally connected at one end to said arm and at the other end to both said pistons, said pistons when fully retracted holding one end of said link at a position equidistant from said bearings, said pistons being limited as to their extensions from said cylinders so that when one piston is fully extended and the other fully retracted, the said one end of said link will be 90° from its position when the pistons are fully retracted, and when both pistons are fully extended said one end of said link will be 180° from its position when said pistons are fully retracted.

References Cited

UNITED STATES PATENTS

| 1,947,348 | 2/1934 | Lovejoy | 74—822UX |
| 3,192,800 | 7/1965 | Kostur | 74—822 |
| 3,408,879 | 11/1968 | Modder et al. | 74—129 |
| 3,466,936 | 9/1969 | Gaupin | 74—88 |

FRED C. MATTERN, JR., Primary Examiner

F. D. SHOEMAKER, Assistant Examiner

U.S. Cl. X.R.

74—88, 126, 129